US010901972B2

(12) United States Patent
Chen

(10) Patent No.: US 10,901,972 B2
(45) Date of Patent: Jan. 26, 2021

(54) TABLE PARTITION CONFIGURATION METHOD, APPARATUS AND SYSTEM FOR DATABASE SYSTEM

(71) Applicant: ALIBABA GROUP HOLDING LIMITED, Grand Cayman (KY)

(72) Inventor: Xinjin Chen, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 197 days.

(21) Appl. No.: 16/016,431

(22) Filed: Jun. 22, 2018

(65) Prior Publication Data

US 2018/0373746 A1     Dec. 27, 2018

(30) Foreign Application Priority Data

Jun. 23, 2017   (CN) .......................... 2017 1 0488164

(51) Int. Cl.
| | |
|---|---|
| *G06F 7/00* | (2006.01) |
| *G06F 16/22* | (2019.01) |
| *G06F 16/27* | (2019.01) |

(52) U.S. Cl.
CPC ...... *G06F 16/2272* (2019.01); *G06F 16/2282* (2019.01); *G06F 16/278* (2019.01)

(58) Field of Classification Search
CPC . G06F 16/2272; G06F 16/2282; G06F 16/278
USPC .................................................. 707/600–899
See application file for complete search history.

(56) References Cited

U.S. PATENT DOCUMENTS

| | | | |
|---|---|---|---|
| 9,053,167 B1* | 6/2015 | Swift | ..................... G06F 16/27 |
| 2017/0116135 A1* | 4/2017 | Sundaravaradan | .......................... G06F 16/9574 |

* cited by examiner

*Primary Examiner* — Isaac M Woo
(74) *Attorney, Agent, or Firm* — Finnegan, Henderson, Farabow, Garrett & Dunner, LLP

(57) ABSTRACT

Embodiments of the present disclose provide a method and apparatus for identifying network attacks. The method can include: acquiring access data within at least two time periods of a target website server according to preset fields; counting a quantity of access data having the same content in each of the preset fields within each of the time periods; determining whether the quantities of access data having the same preset fields within each of the time periods are the same; and in response to the quantities of access data having the same preset fields within each of the time periods being the same, determining access requests corresponding to access data having the same quantity as small-traffic network attacks.

15 Claims, 6 Drawing Sheets

TABLE PARTITION CONFIGURATION METHOD, APPARATUS AND SYSTEM FOR DATABASE SYSTEM

CROSS REFERENCE TO RELATED APPLICATION

The disclosure claims the benefits of priority to Chinese Application Number 201710488164.7, filed Jun. 23, 2017, which is incorporated herein by reference in its entirety.

BACKGROUND

In some database systems, there are generally two types of nodes playing different roles: a Master node for scheduling and a Worker node for providing external data read/write requests and so on. Generally, there are one to three Master nodes and a number of Worker nodes. The number of Worker nodes can range from dozens to hundreds or even thousands. A table in a database system will be split into multiple partitions. The Master node can schedule these partitions onto respective Worker nodes based on a particular scheduling policy and provide external services. In addition, the Master node can also split one partition into multiple partitions according to an access volume, a data volume, a historical trend, and other information of the partition. The Master splits and schedules partitions in such a manner, to achieve the objectives of meeting performance requirements of users and balancing the system load.

However, it is impossible to accurately estimate throughput of each partition in a table of burst traffic or a newly created table. Therefore, a user can hardly schedule partitions of the tale reasonably by using the Master node.

SUMMARY OF THE DISCLOSURE

Embodiments of the present disclosure provide a table partition configuration method, apparatus and system for a database system, which can schedule partitions of a table reasonably and improve partition scheduling efficiency of the table.

According to a first aspect, a table partition configuration method for a database system is provided. The method can include: acquiring reserved throughput of a table; acquiring service capacity information of partitions in the database system and current partition usage information of the table; and configuring partitions of the table according to the reserved throughput of the table, the service capacity information of the partitions in the database system and the current partition usage information of the table.

According to a second aspect, a table partition configuration apparatus for a database system is provided. The table partition configuration apparatus can include: an acquisition unit configured to acquire reserved throughput of a table, service capacity information of partitions in the database system, and current partition usage information of the table; and a configuration unit configured to configure partitions of the table according to the reserved throughput of the table, the service capacity information of the partitions in the database system and the current partition usage information of the table.

According to a third aspect, an electronic device is provided. The electronic device can include: a processor; and a memory configured to store computer executable instructions. The executable instructions, when being executed, can cause the processor to perform the following operations: acquiring reserved throughput of a table; acquiring service capacity information of partitions in the database system and current partition usage information of the table; and configuring partitions of the table according to the reserved throughput of the table, the service capacity information of the partitions in the database system and the current partition usage information of the table.

According to a fourth aspect, a computer readable storage medium is provided, wherein the computer readable storage medium stores one or more programs. When being executed by an electronic device including multiple applications, the one or more programs can cause the electronic device to perform the following operations: acquiring reserved throughput of a table; acquiring service capacity information of partitions in the database system and current partition usage information of the table; and configuring partitions of the table according to the reserved throughput of the table, the service capacity information of the partitions in the database system and the current partition usage information of the table.

According to a fifth aspect, a database system is provided, including a Master node and Worker nodes. The Master node can be configured to: acquire reserved throughput of a table; acquire service capacity information of partitions in the database system and current partition usage information of the table; determine partition configuration of the table according to the reserved throughput of the table, the service capacity information of the partitions in the database system and the current partition usage information of the table; and configure partitions of the table according to the partition configuration of the table, and schedule the partitions of the table to the Worker nodes. The Worker node can be configured to: load and/or unload partitions of each table on the Worker node according to partition scheduling performed by the Master node on each table.

According to a sixth aspect, a table partition configuration method for a database system is provided. The table partition configuration apparatus can include: acquiring reserved throughput of a table; acquiring service capacity information of partitions in the database system and current partition usage information of the table; and configuring partitions of the table according to the reserved throughput of the table, the service capacity information of the partitions in the database system and the current partition usage information of the table.

Based on the foregoing technical solutions, the table partition configuration method, apparatus and system in embodiments of the present disclosure can schedule a rational quantity of partitions for a table by determining the quantity of partitions required by the table according to reserved throughput of the table and service capacity information of partitions, and then configuring partitions according to current partition usage information and the quantity of partitions required by the table.

BRIEF DESCRIPTION OF THE DRAWINGS

In order to make technical solution in the embodiments of the present disclosure or in the prior art clearer, accompanying drawings required for describing the embodiments or the prior art are introduced briefly below. It is apparent that the accompanying drawings in the following description are merely some embodiments recorded in the present disclosure. Those of ordinary skill in the art can further obtain other accompanying drawings based on these accompanying drawings without creative efforts.

DETAILED DESCRIPTION

To help those skilled in the art better understand technical solutions in the present disclosure, the technical solutions in embodiments of the present disclosure are described below with reference to the accompanying drawings in embodiments of the present disclosure. It is appreciated that embodiments described are merely some embodiments rather than all embodiments of the present disclosure. Based on embodiments in the present disclosure, all other embodiments obtained by those of ordinary skill in the art without creative efforts belong to the protection scope of the present disclosure.

As used herein, unless specifically stated otherwise, the term "or" encompasses all possible combinations, except where infeasible. For example, if it is stated that a database can include A or B, then, unless specifically stated otherwise or infeasible, the database can include A, or B, or A and B. As a second example, if it is stated that a database can include A, B, or C, then, unless specifically stated otherwise or infeasible, the database can include A, or B, or C, or A and B, or A and C, or B and C, or A and B and C.

Figure 1:
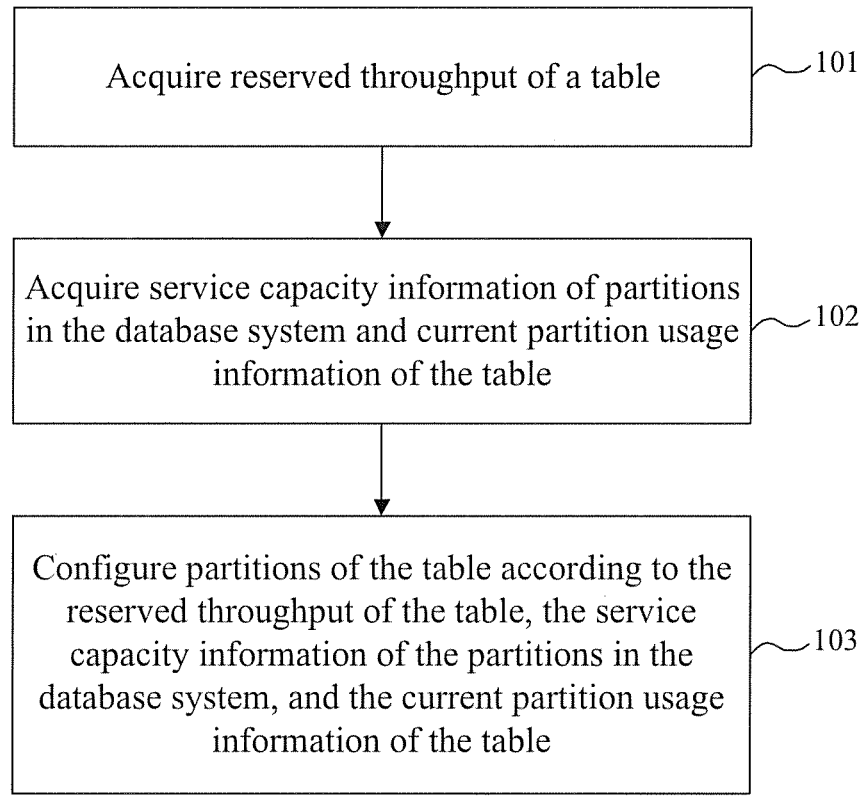
FIG. 1 is a flowchart of a table partition configuration method in a database system according to embodiments of the present disclosure.

FIG. 1 is a flowchart of a table partition configuration method in a database system according to embodiments of the present disclosure. The method in FIG. 1 is performed by a table partition configuration apparatus. For example, in a NoSQL database system, the table partition configuration apparatus is located at a Master node. In other words, the method in FIG. 1 can be performed by the Master node in the NoSQL database system. The method according to embodiments of the present disclosure can also be used by a database system other than the NoSQL database. The method in FIG. 1 can include steps 101-103.

In step 101, reserved throughput of a table can be acquired.

The reserved throughput of a table can be estimated maximum throughput of the table. When reserved throughput of a table is 500,000 records/second, it can indicate that the table can process a maximum of 500,000 records within one second.

In step 102, service capacity information of partitions in the database system and current partition usage information of the table can be acquired.

In step 103, partitions of the table can be configured according to the reserved throughput of the table, the service capacity information of the partitions in the database system, and the current partition usage information of the table.

It is appreciated that a table in a NoSQL database may have one or more partitions for storing data. In embodiments of the present disclosure, the table partition configuration apparatus can configure partitions of the table according to the reserved throughput of the table, the service capacity information of the partitions in the database system, the current partition usage information of the table, and the like.

It is appreciated that partitions in an NoSQL database system may have identical or different capacities. If partitions in the NoSQL database system have identical capacities, the quantity of partitions in the table can be determined during partition configuration of the table. If there are partitions having different capacities in the NoSQL database system, it may be necessary to determine types of partitions configured for the table and the quantity of partitions of each type during partition configuration of the table. In general cases, a table can be configured with one type of partitions.

In embodiments of the present disclosure, partitions of a table are configured according to reserved throughput of the table, service capabilities of partitions, and current partition usage information of the table. Therefore, partitions can be scheduled reasonably for the table, thus improving the distribution efficiency of system resources.

In some embodiments, step 103 can further include: determining the quantity of partitions to be configured for the table according to the reserved throughput of the table and the service capacity information of the partitions in the database system; and configuring the partitions of the table according to the current partition usage information of the table and the quantity of partitions to be configured for the table.

In embodiments of the present disclosure, the quantity of partitions for the table can be determined according to the reserved throughput of the table and the service capacity information of partitions, and then partitions can be configured according to the current partition usage information and the quantity of partitions for the table, so that a reasonable quantity of partitions can be scheduled for the table.

In some embodiments, the step of configuring the partitions of the table according to the current partition usage information of the table and the quantity of partitions to be configured for the table may include: configuring the partitions of the table according to the current partition usage information of the table and the quantity of partitions to be configured for the table when the current partition quantity of the table does not equal the quantity of partitions to be configured for the table, wherein the current partition usage information of the table includes the current partition quantity of the table.

In some embodiments of the present disclosure, redundant partition configuration operations can be avoided to some extent by configuring partitions when the quantity of partitions for the table changes.

As an example, the step of configuring the partitions of the table according to the current partition configuration of the table and the quantity of partitions to be configured for the table can include: merging at least two current partitions in the table if the current partition quantity N of the table is greater than the quantity M of partitions to be configured for the table, such that the quantity of partitions in the table is M after merging, wherein M and N are positive integers.

Further, in some embodiments, the step of configuring the partitions of the table according to the current partition configuration of the table and the quantity of partitions to be configured for the table may further include: merging every k current partitions in the table into one partition if the current partition quantity N of the table is k times of the quantity M of partitions to be configured for the table, wherein k is a positive integer greater than 1.

Partitions can be merged at a same quantity, so that data in the table can be uniformly distributed to some extent after merging.

In some embodiments, the step of configuring the partitions of the table according to the current partition configuration of the table and the quantity of partitions to be configured for the table may further include: adding M-N blank partitions in the table if the current partition quantity N of the table is less than the quantity M of partitions to be configured for the table, wherein N is a non-negative integer, and M is a positive integer. It should be understood that the blank partition refers to a newly created partition in which no data has been written.

In some embodiments, the step of configuring the partitions of the table according to the current partition configuration of the table and the quantity of partitions to be configured for the table may further include: splitting at least two of current partitions in the table if the current partition quantity N of the table is less than the quantity M of partitions to be configured for the table, such that the quantity of partitions in the table is M after merging.

Further, in some embodiments, the step of configuring the partitions of the table according to the current partition configuration of the table and the quantity of partitions to be configured for the table may further include: splitting each current partition in the table into k partitions if the quantity M of partitions to be configured for the table is k times of the current partition quantity N of the table, wherein k is a positive integer greater than 1.

It should be understood that, each partition can be split into k partitions uniformly, so that data in the table can be uniformly distributed in split partitions to some extent.

In some embodiments, the step of configuring the partitions of the table according to the current partition configuration of the table and the quantity of partitions to be configured for the table can include: splitting each current partition in the table into M/k sub-partitions and merging every N/k sub-partitions to form merged partitions, if the greatest common divisor between the current partition quantity N of the table and the quantity M of partitions to be configured for the table is k, wherein M, N and k are positive integers, M≠k, and N≠k.

It should be understood that, each partition can be split into M/k partitions uniformly in the splitting step, so that data in the table can be uniformly distributed in partitions that are obtained after splitting and merging.

In some embodiments, the method can further include: acquiring service capacity information of Worker nodes of the database system and loaded partition information of the Worker nodes of the database system. The step of configuring partitions of the table further includes: determining the quantity of partitions of the table to be loaded on each Worker node of the database system according to the service capacity information of the partitions, the quantity of partitions to be configured for the table, a partition result of the table, the service capacity information of the Worker nodes of the database system, and the loaded partition information of the Worker nodes of the database system. For example, load balancing can be performed on the quantities of partitions loaded on the Worker nodes according to the service capacity information of the partitions, the quantity of partitions to be configured for the table, the partition result of the table, the service capacity information of the Worker nodes of the database system, and the loaded partition information of the Worker nodes of the database system.

It is appreciated that the current load information of the Worker node can further include throughput of partitions currently loaded on the Worker node. In embodiments of the present disclosure, the quantity of partitions to be loaded on each Worker node can also be determined according to the throughput of partitions currently loaded on each Worker node and reserved throughput of to-be-loaded partitions of the table, so that system balancing can be performed on real-time load of the Worker nodes.

In addition, respective partitions can be scheduled to corresponding Worker nodes after the quantity of partitions of the table to be loaded by each Worker node in the database system is determined, and the Worker nodes complete partition loading operations. It is appreciated that the Worker node can unload invalid partitions and load newly added partitions. The invalid partition can be in a pre-configuration partition set of the table, and a splitting and/or merging operation can be performed on the invalid partition in the partition configuration process. The newly added partition is a new partition added in a post-configuration partition set of the table as compared with the pre-configuration partition set.

It is appreciated that a Master node can notify corresponding nodes of at least one of loading or unloading information of partitions during partition scheduling. For example, before the Master node schedules partitions, partition 1 is loaded on Worker1 node. After scheduling, partition 1 is split into partition 2 and partition 3, partition 2 is loaded on Worker1 node, and partition 3 is loaded on Worker2 node. In this case, the Master node can inform Worker1 node to unload partition 1 and load partition 2, inform Worker2 node to load partitions, and so on. It should be understood that Worker1 and Worker2 can be informed simultaneously or informed one after another, and the informing sequence is not limited. The Master node can also broadcast partition scheduling information of all nodes.

In addition, it is appreciated that the Master node can further perform load balancing on partitions loaded by respective Worker nodes after finishing partition configuration of the table. For example, the Master node can further acquire real-time throughput of partitions currently loaded on the Worker nodes, access volumes of the partitions currently loaded on the Worker nodes, and so on, and perform load balancing on partitions loaded on the Worker nodes according to the real-time throughput or access volumes of the partitions on the Worker nodes.

In some embodiments, the step of acquiring reserved throughput of a table may include: acquiring reserved throughput of the table periodically; or acquiring reserved throughput of the table when the reserved throughput of the table changes. In some embodiments of the present disclosure, it is determined whether to configure partitions of the table by acquiring the reserved throughput of the table periodically or by monitoring changes in the reserved throughput of the table. Therefore, partitions of the table can be configured flexibly by configuring the reserved throughput of the table, thus improving the usability of partition configuration.

The method can be further described below with reference to embodiments as below.

Figure 2:
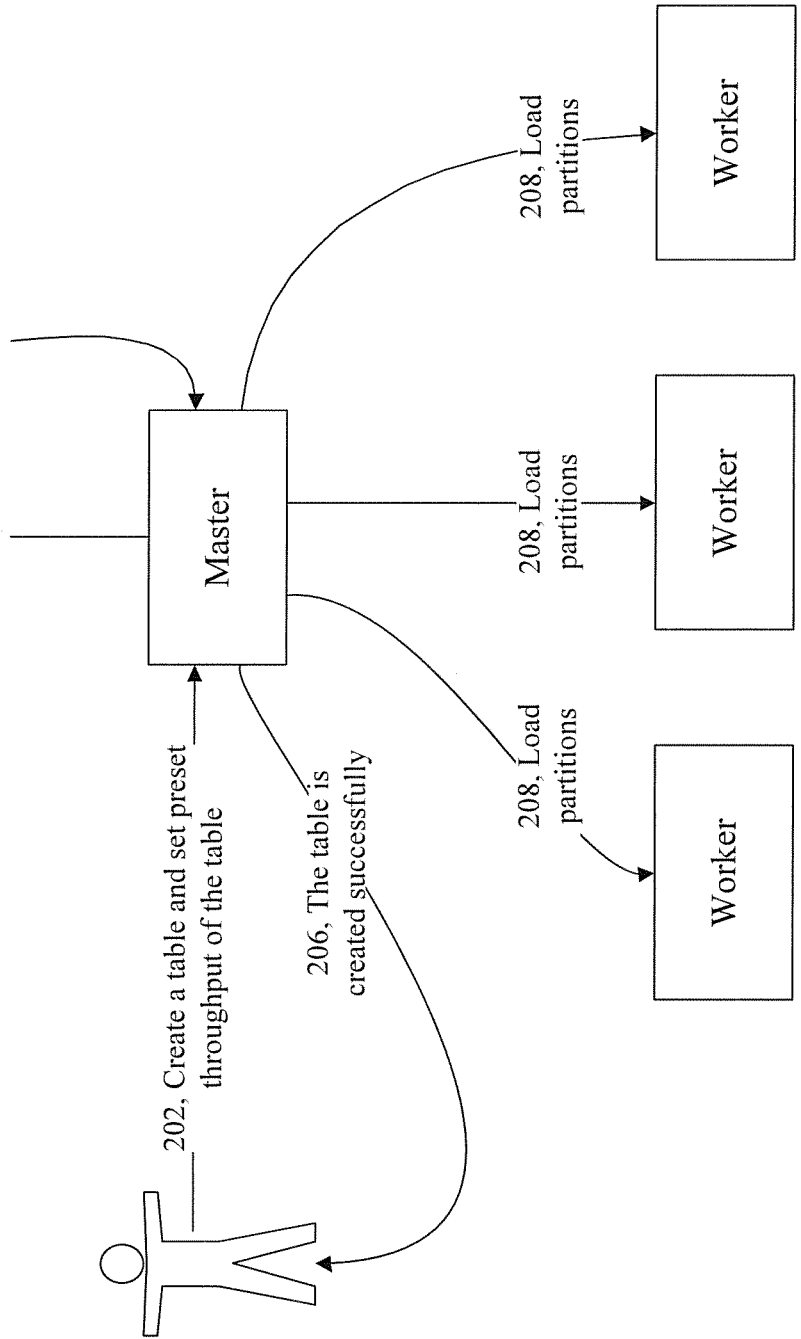
FIG. 2 is a flowchart of configuring partitions of a table according to reserved throughput of the table and loading the partitions according to embodiments of the present disclosure.

FIG. 2 is a flowchart of configuring partitions of a table according to reserved throughput of the table and loading the partitions according to embodiments of the present disclosure. The method in FIG. 2 is applicable to a scenario of newly creating a table. The method in FIG. 2 includes steps 202-208.

In step 202, a user creates a table and sets reserved throughput of the table.

In step 204, a Master node splits partitions of the table according to the reserved throughput and schedules the partitions to Worker nodes.

After receiving a table creation request from the user, the Master node can determine the quantity of partitions for the table according to the reserved throughput set by the user in combination with a service capacity of a partition in a database system. For example, if the reserved throughput of the table is recorded as X and the service capacity of the partition is recorded as P, the quantity of partitions for the table is CEILING (X/P), wherein CEILING represents rounding up. In embodiments of the present disclosure, the Master node can acquire information such as the reserved throughput of the table and the service capacity of the partition.

For example, if the reserved throughput of the table is 300,000 records/second, and the capacity of the partition is 90,000 records/second, the Master node can determine that the quantity of partitions for the table is CEILING(30/9)=4.

In addition, the Master node can also determine the quantity of partitions to be loaded on each Worker node according to a capacity of each Worker node, the quantity of partitions currently loaded on each Worker node, the quantity of partitions for the table, and so on, and schedule the partitions of the table to all Worker nodes in the database system, to achieve load balancing on the quantities of loaded partitions in the database system.

For example, it is assumed that there are three Worker nodes each having a service capacity of 10,000,000 records/second, and a capacity of a partition is 100,000 records/second and reserved throughput of a newly added table is 3,000,000 records/second. The three Worker nodes have loaded 30, 25, and 40 partitions respectively, and the Master can distribute 30 partitions for the newly added table to the three Worker nodes, so that the quantities of partitions loaded on the three Worker nodes can be as close as possible. For example, the three partitions finally load 42, 42, and 41 partitions respectively.

It is appreciated that different Worker nodes may have different working capacities. And reserved throughput/load ratios of the Worker nodes can be similar. The reserved throughput/load ratio of the Worker node means a ratio of total reserved throughput of partitions loaded on the Worker node to the service capacity of the Worker node.

In step 206, the Master node can return information indicating that the table has been created to the user.

After finishing scheduling partitions of the table, the Master node can return information indicating that the table has been created to the user.

In step 208: The Worker nodes can load the partitions.

The Worker nodes load the partitions of the table according to the scheduling result of the Master node.

Figure 3:
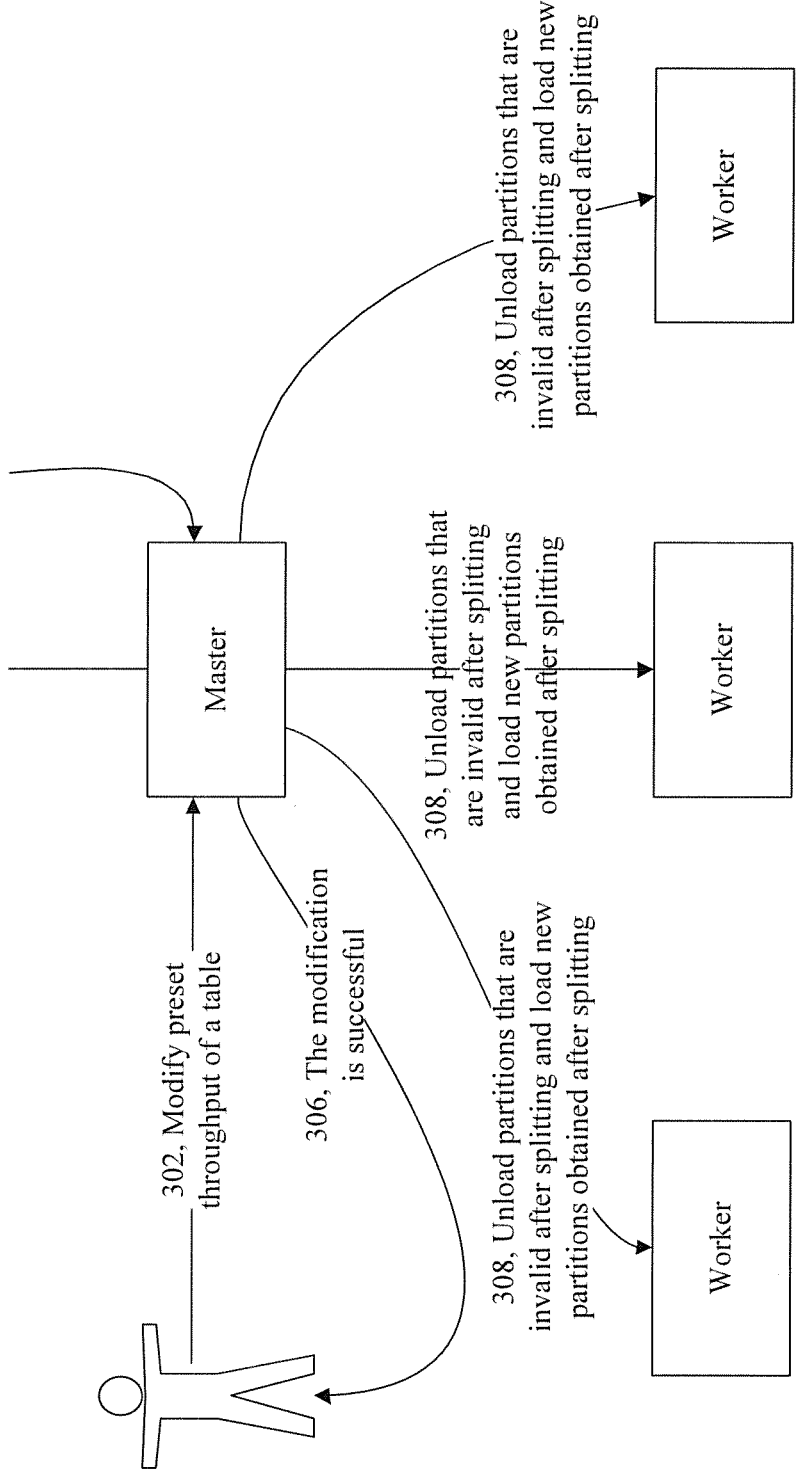
FIG. 3 is a flowchart of configuring partitions of a table according to reserved throughput of the table and loading the partitions according to embodiments of the present disclosure.

FIG. 3 is a flowchart of configuring partitions of a table according to reserved throughput of the table and loading the partitions according to embodiments of the present disclosure. The method in FIG. 3 is applicable to a scenario where reserved throughput of a table changes. The method in FIG. 3 includes steps 302-308.

In step 302, a user can modify reserved throughput of a table. The user can modify reserved throughput information of a table when anticipating a dramatic increase or a dramatic decrease in throughput corresponding to the table.

For example, data throughput during a "second kill" service, "Black Friday", and the like would be much higher than that at ordinary times. Therefore, relatively high reserved throughput can be configured. The data throughput would decline drastically after the second kill service, Black Friday activities, and the like are finished, and therefore low reserved throughput can be configured.

In step 304, a Master node can adjust partitions of the table according to the modified preset throughput, and re-schedule partitions. Similar to step 204 in FIG. 2, after receiving a table creation request from the user, the Master node can determine the quantity of partitions for the table according to the reserved throughput set by the user in combination with a service capacity of a partition in a database system.

After the quantity of partitions for the table is determined, the partitions of the table can be configured according to the current partition configuration of the table and the quantity of partitions to be configured for the table.

In some embodiments, if the current partition quantity N of the table is greater than the quantity M of partitions to be configured for the table, some of the current partitions in the table can be merged, so that the quantity of partitions in the table is M after merging. M and N are positive integers.

For example, if the reserved throughput of the table is 300,000 records/second, the capacity of a partition is 100,000 records/second, and the current partition quantity of the table is five, the Master node can determine that the quantity of partitions for the table is three (i.e., 300,000/100,000). In one instance, the Master node can merge every two partitions in the table as one, so that the five partitions can be merged to reduce the quantity of partitions from five to three. In another instance, the Master node can merge three of the five partitions into one partition, so that the quantity of partitions in the table can also be reduced to three.

Further, every k current partitions in the table can be merged into one partition if the current partition quantity N of the table is k times of the quantity M of partitions to be configured for the table, wherein k is a positive integer greater than 1.

For example, if the reserved throughput of the table is 300,000 records/second, the capacity of the partition is 100,000 records/second, and the current partition quantity of the table is nine, the Master node can determine that the quantity of partitions for the table is three. In this case, the Master node can merge every three partitions in the table into one partition, so that the table can have three partitions after the merging.

In some embodiments, when the current partition quantity N of the table is less than the quantity M of partitions to be configured for the table, M-N blank partitions can be added in the table. N is a non-negative integer, and M is a positive integer.

For example, if the reserved throughput of the table is 500,000 records/second, the capacity of the partition is 100,000 records/second, and the current partition quantity of the table is three, the Master node can determine that the quantity of partitions for the table is five. In this case, the Master node can add two blank partitions in the table.

In some embodiments, the current partition quantity N of the table is less than the quantity M of partitions to be configured for the table, at least two of current partitions in the table can be split, such that the quantity of partitions in the table is M after the splitting.

For example, if the reserved throughput of the table is 500,000 records/second, the capacity of the partition is 100,000 records/second, and the current partition quantity of the table is three, the Master node can determine that the quantity of partitions for the table is five. In this case, the Master node can split two partitions in the table to obtain four partitions, such that the table has five partitions.

Further, if the quantity M of partitions to be configured for the table is k times of the current partition quantity N of the table, each current partition in the table can be split into k partitions. K is a positive integer greater than one.

For example, if the reserved throughput of the table is 900,000 records/second, the capacity of the partition is 100,000 records/second, and the current partition quantity of the table is three, the Master node can determine that the quantity of partitions for the table is nine. In this case, the Master node can split each partition in the table into three partitions, such that the table has nine partitions after the splitting.

It is appreciated that, when each current partition in the table is split into k partitions, each partition can be split into k partitions uniformly, so that data in the table can be uniformly distributed in split partitions.

In some embodiments, if the greatest common divisor between the current partition quantity N of the table and the quantity M of partitions to be configured for the table is k, each current partition in the table can be split into M/k sub-partitions and every N/k sub-partitions are merged to form merged partitions. M, N and k are positive integers, M≠k, and N≠k.

For example, if the reserved throughput of the table is 1,000,000 records/second, the capacity of the partition is 100,000 records/second, and the current partition quantity of the table is six, the Master node can determine that the quantity of partitions for the table is 10. The greatest common divisor between 10 and 6 is 2. In this case, the Master node can split each partition in the table into 10/2=5 sub-partitions, and every 6/2=3 sub-partitions obtained after the splitting can be merged into one partition, such that the table has five partitions.

It is appreciated that, when each current partition in the table is split into M/k sub-partitions, each partition can be split into M/k partitions uniformly, so that data in the table can be uniformly distributed to in partitions that are obtained after splitting and merging.

In addition, the step of configuring partitions of the table can further include: scheduling partitions obtained after the splitting and/or merging operation to Worker nodes of the database system. The step of configuring partitions of the table can further include: determining the quantity of partitions of the table to be loaded on each Worker node of the database system according to service capacity information of the partitions, the quantity of partitions to be configured for the table, partition information of the table before and after processing, service capacity information of the Worker nodes of the database system, and loaded partition information of the Worker nodes of the database system. In this way, load balancing of the quantities of partitions can be considered on the Worker nodes. For example, load balancing can be performed on the quantities of partitions loaded on the Worker nodes according to the service capacity information of the partitions, the quantity of partitions to be configured for the table, the partition information of the table before and after processing, the service capacity information of the Worker nodes of the database system, and the loaded partition information of the Worker nodes of the database system. It is appreciated that the partition information of the table before and after processing generally can include information of invalid partitions and information of newly added partitions of the table.

For example, table 1 can originally have four partitions A, B, C, and D. Partitions A and B are loaded onto Worker1 node, partition C is loaded to Worker node 2, and partition D is loaded to Worker3 node. Partitions of table 1 can be adjusted to 12 partitions according to reserved throughput. Each of partitions A, B, C, and D can be respectively split to obtain four groups, e.g., A1-A3, B1-B3, C1-C3, and D1-D3. Partitions A1-A3 and B1 are scheduled to Worker1 node, partitions C1-C3 and B2 are scheduled to Worker2 node, and partitions D1-D3 and B3 are scheduled to Worker3 node.

In step 306, the Master node returns information indicating that the modification is successful to the user.

In step 308, the Worker nodes unload invalid partitions of the table and load newly added partitions of the table according to a scheduling result.

For example, in step 304, the Master node can schedule A1-A3 and B1 to Worker1 node, schedule C1-C3 and B2 to Worker2 node, and schedule D1-D3 and B3 to Worker3 node. In this case, Worker1 node may unload the invalid partitions A and B and load the newly added partitions A1-A3 and B1, Worker2 node may unload the invalid partition C and load the newly added partitions C1-C3 and B1, and Worker3 node may unload the invalid partition D and load the newly added partitions D1-D3 and B3.

Embodiments of the disclosure have been described above. In some cases, the actions or steps recorded in the claims can still achieve the expected result when being executed according to a sequence different from the sequences in the embodiments. In addition, the processes depicted in the drawings can still achieve the expected result without following the particular sequence or consecutive sequence shown in the drawings. In some implementations, multi-task processing and parallel processing are also feasible or can be beneficial.

Figure 4:
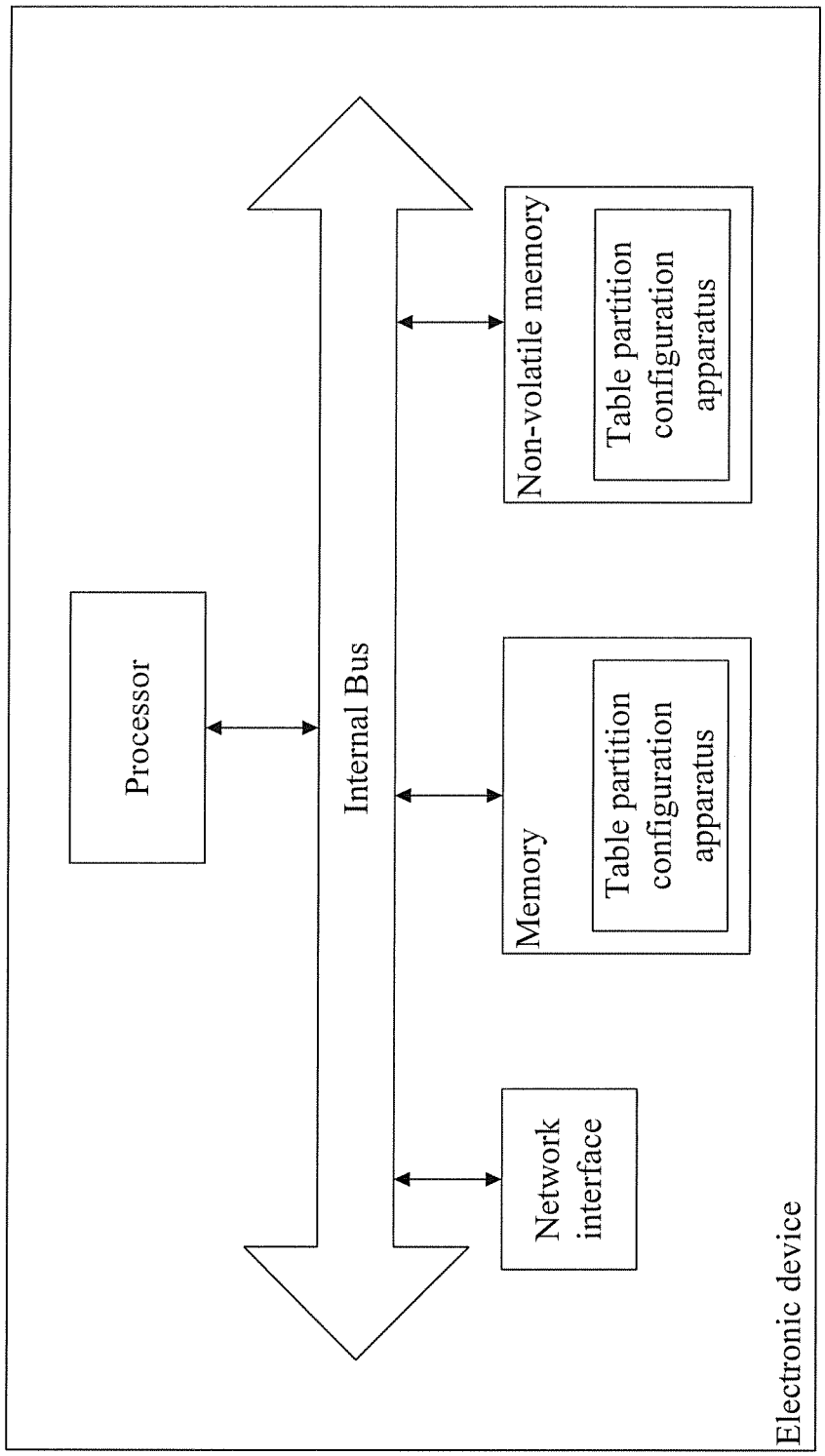
FIG. 4 illustrates a schematic diagram of an electronic device according to embodiments of the present disclosure.

FIG. 4 illustrates a schematic diagram of an electronic device according to embodiments of the present disclosure. Referring to FIG. 4, in the hardware level, the electronic device can include a processor, an internal bus, a network interface, and a memory. The memory may include an internal memory, such as a high-speed Random Access Memory (RAM), and may further include a non-volatile memory, such as at least one magnetic disk memory. The electronic device can further include other hardware required by services.

The processor, the network interface, and the memory may be connected to each other through the internal bus. The internal bus may be an Industry Standard Architecture (ISA) bus, a Peripheral Component Interconnect (PCI) bus, an Extended Industry Standard Architecture (EISA) bus, or the like. The bus may be classified as an address bus, a data bus, a control bus, or the like. For ease of representation, only one bidirectional arrow is used in FIG. 4 to represent the bus, but it does not represent that there is only one bus or only one type of bus.

The memory can be configured to store programs. For example, the programs may include memory code, and the memory code can include computer operation instructions. The memory can include an internal memory and a non-volatile memory, and provide instructions and data for the processor.

The processor can read a corresponding computer program from the non-volatile memory into the internal memory and then run the program, to form a table partition configuration apparatus in the logical level. The processor can execute the program stored in the memory to perform the following operations: acquiring reserved throughput of a table; acquiring service capacity information of partitions in the database system and current partition usage information of the table; and configuring partitions of the table according to the reserved throughput of the table, the service capacity information of the partitions in the database system, and the current partition usage information of the table.

The method executed by the Master node or table partition configuration apparatus as disclosed in embodiments with reference to FIG. 1 of the present disclosure can be applied to the processor or implemented by the processor. The processor may be an integrated circuit chip having a signal processing capability. In an implementation process, the steps of the foregoing method can be completed by hardware integrated logic circuits in the processor or software-form instructions. The processor may be a processor including a Central Processing Unit (CPU), a Network Processor (NP), or the like, and may also be a Digital Signal Processor (DSP), an Application Specific Integrated Circuit (ASIC), a Field-Programmable Gate Array (FPGA) or another programmable logic device, a discrete gate, a transistor logic device, or a discrete hardware component. The processor can implement or execute various methods, steps and logic block diagrams disclosed in the embodiments of the present disclosure. The processor may be a microprocessor, or any regular processor or the like. Steps of the method disclosed in combination with the embodiment of the present disclosure can be directly embodied as being executed by a hardware decoding processor or executed by a combination of hardware in the decoding processor and software modules. The software modules can be located in a mature storage medium in the art, such as a random access memory, cloud storage, a flash memory, a read-only memory, a programmable read-only memory, an electrically erasable programmable read-only memory, or a register. The storage medium is located in the memory. The processor reads information in the memory and completes the steps of the method in combination with the hardware of the processor.

In embodiments of the present disclosure, partitions of a table can be configured according to reserved throughput of the table, service capabilities of partitions, and current partition usage information of the table, so that partitions can be scheduled reasonably for the table, thus improving the distribution efficiency of system resources.

The electronic device can further execute the method of embodiments shown in FIG. 1 and implement the functions of the Master node or table partition configuration apparatus in embodiments shown in FIG. 1 to FIG. 3. Details are not described again in this embodiment of the present disclosure.

In addition to the software implementation, the electronic device of the present disclosure does not exclude other implementations, such as a logic device, or a combination of hardware and software. In other words, entities executing the following processing procedure are not limited to logic units but may also be hardware or logic devices.

Embodiments of the present disclosure further provides a computer readable storage medium. The computer readable storage medium stores one or more programs, and the one or more programs include an instruction. When being executed by an electronic device, the instruction can cause the electronic device to execute the method of embodiments shown in FIG. 3, the method including: acquiring reserved throughput of a table; acquiring service capacity information of partitions in the database system and current partition usage information of the table; and configuring partitions of the table according to the reserved throughput of the table, the service capacity information of the partitions in the database system and the current partition usage information of the table.

Figure 5:
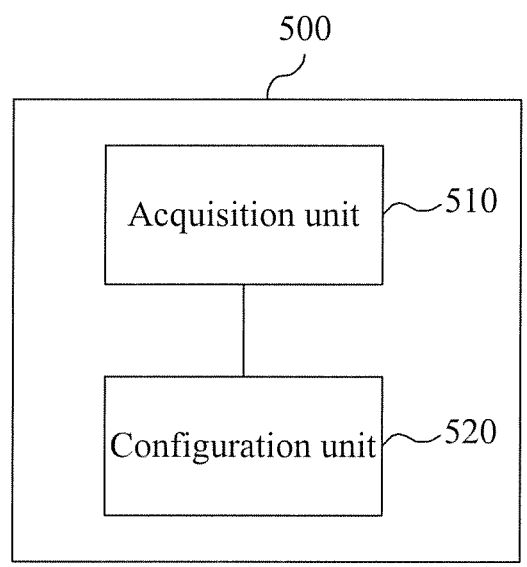
FIG. 5 is a schematic diagram of a table partition configuration apparatus according to embodiments of the present disclosure.

FIG. 5 is a schematic diagram of a table partition configuration apparatus 500 for a database system according to embodiments of the present disclosure. As shown in FIG. 5, the table partition configuration apparatus 500 can include an acquisition unit 510 and a configuration unit 520.

Acquisition unit 510 can be configured to acquire reserved throughput of a table. Acquisition unit 510 can be further configured to acquire service capacity information of partitions in the database system and current partition usage information of the table.

Configuration unit 520 can be configured to configure partitions of the table according to the reserved throughput of the table, the service capacity information of the partitions in the database system, and the current partition usage information of the table.

In embodiments of the present disclosure, partitions of a table are configured according to reserved throughput of the table, service capabilities of partitions, and current partition usage information of the table, so that partitions can be scheduled reasonably for the table, thus improving the distribution efficiency of system resources.

For example, configuration unit 520 can be configured to determine the quantity of partitions to be configured for the table according to the reserved throughput of the table and the service capacity information of the partitions in the database system; and can configure the partitions of the table according to the current partition usage information of the table and the quantity of partitions to be configured for the table.

In embodiment of the present disclosure, the quantity of partitions for the table is determined according to the reserved throughput of the table and the service capacity information of partitions. Then partitions are configured according to the current partition usage information and the quantity of partitions for the table, so that a reasonable quantity of partitions can be scheduled for the table.

For example, when the current partition quantity of the table does not equal the quantity of partitions to be configured for the table, configuration unit 520 is configured to configure the partitions of the table according to the current partition usage information of the table and the quantity of partitions to be configured for the table. The current partition usage information of the table can include the current partition quantity of the table.

In embodiments of the present disclosure, redundant partition configuration operations can be avoided to some extent by configuring partitions when the quantity of partitions for the table changes.

In some embodiments, if the current partition quantity N of the table is greater than the quantity M of partitions to be configured for the table, configuration unit 520 is configured to merge at least two of current partitions in the table, such that the quantity of partitions in the table is M after merging, wherein M and N are positive integers.

Further, in a possible implementation of this embodiment, if the current partition quantity N of the table is k times of the quantity M of partitions to be configured for the table, the configuration unit 520 is configured to merge every k current partitions in the table into 1 partition, wherein k is a positive integer greater than 1.

In embodiments of the present disclosure, partitions are merged at the same quantity, so that data in the table can be uniformly distributed to some extent after merging.

In some embodiments, if the current partition quantity N of the table is less than the quantity M of partitions to be configured for the table, configuration unit 520 is configured to add M-N blank partitions in the table, wherein N is a non-negative integer, and M is a positive integer.

In some embodiments, if the current partition quantity N of the table is less than the quantity M of partitions to be configured for the table, configuration unit 520 is configured to split at least two of current partitions in the table, such that the quantity of partitions in the table is M after merging.

Further, in a possible implementation of this embodiment, if the quantity M of partitions to be configured for the table is k times of the current partition quantity N of the table, configuration unit 520 is configured to split each current partition in the table into k partitions, wherein k is a positive integer greater than 1.

It is appreciated that, a preferred solution is to split each partition into k partitions uniformly, so that data in the table can be uniformly distributed in split partitions to some extent.

In some embodiments, if the greatest common divisor between the current partition quantity N of the table and the quantity M of partitions to be configured for the table is k, configuration unit 520 is configured to split each current partition in the table into M/k sub-partitions and merging every N/k sub-partitions to form merged partitions, wherein M, N and k are positive integers, $M \neq k$, and $N \neq k$.

In some embodiments, acquisition unit 510 can be further configured to acquire service capacity information of Worker nodes of the database system and loaded partition information of the Worker nodes of the database system. Configuration unit 520 is further configured to determine the quantity of partitions in the table to be loaded on each Worker node of the database system according to the service capacity information of the partitions, the quantity of partitions to be configured for the table, an adjusted partition result of the table, the service capacity information of the Worker nodes of the database system, and the loaded partition information of the Worker nodes of the database system. Specifically, load balancing can be performed on the quantities of partitions loaded on the Worker nodes according to the service capacity information of the partitions, the quantity of partitions to be configured for the table, the partition result of the table, the service capacity information of the Worker nodes of the database system, and the loaded partition information of the Worker nodes of the database system.

In some embodiments, acquisition unit 510 is configured to acquire reserved throughput of the table periodically; or configured to acquire reserved throughput of the table when the reserved throughput of the table changes. In the embodiment of the present disclosure, it is determined whether to configure partitions of the table by acquiring the reserved throughput of the table periodically or by monitoring changes in the reserved throughput of the table, so that partitions of the table can be configured flexibly by configuring the reserved throughput of the table, thus improving the usability of partition configuration.

Table partition configuration apparatus 500 can further execute the method of the embodiment shown in FIG. 1, and implement functions of the Master node or table partition configuration apparatus in the embodiments shown in FIG. 1 to FIG. 3. Details are not described again in the embodiment of the present disclosure.

Figure 6:
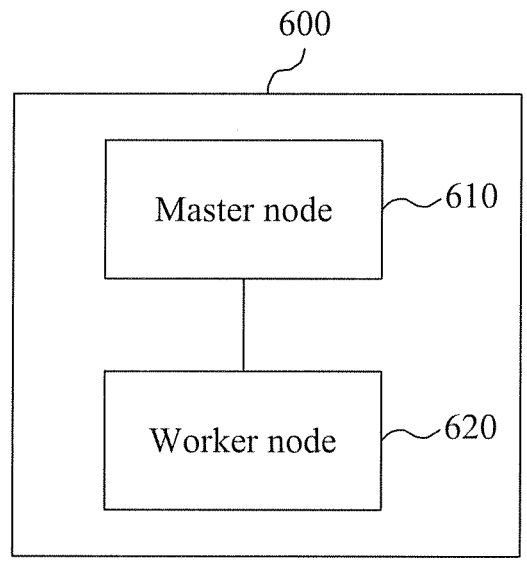
FIG. 6 is a schematic diagram of a database system according to embodiments of the present disclosure.

The present disclosure further provides a database system 600, as shown in FIG. 6. Database system 600 can include a Master node 610 and Worker nodes 620.

Master node 610 can be configured to: acquire reserved throughput of a table; acquire service capacity information of partitions in database system 600 and current partition usage information of the table; and determine partition configuration of the table according to the reserved throughput of the table, the service capacity information of the partitions in database system 600 and the current partition usage information of the table; and configure partitions of the table according to the partition configuration of the table, and schedule the partitions of the table to the Worker nodes.

Worker node 620 can be configured to: load and/or unload partitions of each table on Worker node 620 according to partition scheduling performed by Master node 610 on each table.

For the implementation of Master node 610, reference may be made to the electronic device of embodiments shown in FIG. 4 or table partition configuration apparatus 500 of embodiments shown in FIG. 5. Details are not described again.

In sum, the above descriptions are merely embodiments of the present disclosure but are not intended to limit the protection scope of the present disclosure. Any modification, equivalent replacement, improvement and the like made within the spirit and principle of the present disclosure should all be included in the protection scope of the present disclosure.

The system, apparatus, modules or units illustrated in the foregoing embodiments can be implemented by a computer chip or an entity, or implemented by a product having a particular function. A typical implementation device is a computer. The computer for example can be a personal computer, a laptop computer, a cellular phone, a camera phone, a smart phone, a personal digital assistant, a media player, a navigation device, an e-mail device, a game console, a tablet computer, a wearable device, or a combination of any of these devices.

A computer readable medium includes non-volatile and volatile media as well as movable and non-movable media, and can implement information storage by means of any method or technology. Information may be a computer readable instruction, a data structure, and a module of a program or other data. For example, a storage medium of a computer includes, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission media, and can be used to store information accessible to the computing device. According to the definition herein, the computer readable medium does not include transitory media, such as modulated data signals and carriers.

It should be further noted that the terms "include", "comprise" or other variations thereof are intended to cover non-exclusive inclusion, so that a process, method, commodity or device including a series of elements not only includes the elements, but also includes other elements not clearly listed, or further includes inherent elements of the process, method, commodity or device. In the absence of more limitations, an element defined by "including a/an . .

." does not exclude that the process, method, commodity or device including the element further has other identical elements.

Embodiments of the disclosure are described progressively. Identical or similar parts of embodiments may be obtained with reference to each other. Each embodiment focuses on description of a part different from other embodiments. The system embodiments are similar to the method embodiments, so they are described simply. For related parts, refer to the descriptions of the parts in the method embodiments.

What is claimed is:

1. A table partition configuration method for a database system, comprising:
    acquiring reserved throughput of a table that is estimated by a maximum number of records that the table processes within a unit of time;
    acquiring service capacity information of partitions in the database system and current partition usage information of the table; and
    configuring partitions of the table according to the reserved throughput of the table, the service capacity information of the partitions in the database system, and the current partition usage information of the table.

2. The method of claim 1, wherein configuring the partitions of the table according to the reserved throughput of the table, the service capacity information of the partitions in the database system, and the current partition usage information of the table further comprises:
    determining a quantity of partitions to be configured for the table according to the reserved throughput of the table and the service capacity information of the partitions in the database system; and
    configuring the partitions of the table according to the current partition usage information of the table and the quantity of partitions to be configured for the table.

3. The method of claim 2, wherein configuring the partitions of the table according to the current partition usage information of the table and the quantity of partitions to be configured for the table further comprises:
    configuring the partitions of the table according to the current partition usage information of the table and the quantity of partitions to be configured for the table when a current partition quantity of the table does not equal the quantity of partitions to be configured for the table,
    wherein the current partition usage information of the table comprises the current partition quantity of the table and the current partition quantity of the table is N and the quantity of partitions to be configured for the table is M.

4. The method of claim 3, wherein configuring the partitions of the table according to the current partition configuration of the table and the quantity of partitions to be configured for the table comprises:
    merging at least two current partitions in the table in response to the current partition quantity N of the table being greater than the quantity M of partitions to be configured for the table, such that a quantity of merged partitions in the table is M after merging, wherein M and N are positive integers.

5. The method of claim 4, wherein configuring the partitions of the table according to the current partition configuration of the table and the quantity of partitions to be configured for the table further comprises:
    merging k current partitions in the table into one partition, in response to the current partition quantity N of the table being k times of the quantity M of partitions to be configured for the table, wherein k is a positive integer greater than one.

6. The method of claim 4, further comprising: acquiring service capacity information of worker nodes of the database system and loaded partition information of the worker nodes of the database system, wherein configuring partitions of the table further comprises:
    determining the quantity of partitions of the table to be loaded on each worker node of the database system according to the service capacity information of the partitions, the quantity of partitions to be configured for the table, an adjusted partition result of the table, the service capacity information of the worker nodes of the database system, and the loaded partition information of the worker nodes of the database system.

7. The method of claim 2, wherein configuring the partitions of the table according to the current partition configuration of the table and the quantity of partitions to be configured for the table further comprises:
    adding M-N blank partitions in the table, in response to the current partition quantity N of the table being less than the quantity M of partitions to be configured for the table, wherein N is a non-negative integer, and M is a positive integer.

8. The method of claim 2, wherein configuring the partitions of the table according to the current partition configuration of the table and the quantity of partitions to be configured for the table further comprises:
    splitting at least two current partitions in the table, in response to the current partition quantity N of the table being less than the quantity M of partitions to be configured for the table, such that a quantity of split partitions in the table is M.

9. The method of claim 8, wherein configuring the partitions of the table according to the current partition configuration of the table and the quantity of partitions to be configured for the table further comprises:
    splitting each current partition in the table into k partitions, in response to the quantity M of partitions to be configured for the table being k times of the current partition quantity N of the table, wherein k is a positive integer greater than 1.

10. The method of claim 2, wherein configuring the partitions of the table according to the current partition configuration of the table and the quantity of partitions to be configured for the table comprises:
    splitting each current partition in the table into M/k sub-partitions and merging every N/k sub-partitions to form merged partitions, in response to the greatest common divisor between the current partition quantity N of the table and the quantity M of partitions to be configured for the table being k, wherein M, N and k are positive integers, M≠k, and N≠k.

11. The method of claim 1, wherein acquiring reserved throughput of a table further comprises:
    acquiring reserved throughput of the table periodically or when the reserved throughput of the table changes.

12. The method of claim 1, wherein the database system is a NoSQL system.

13. An electronic device, comprising:
    a memory configured to store computer executable instructions; and
    a processor configured to perform the instructions to cause the electronic device to perform:

acquiring reserved throughput of a table that is estimated by a maximum number of records that the table processes within a unit of time;

acquiring service capacity information of partitions in the database system and current partition usage information of the table; and configuring partitions of the table according to the reserved throughput of the table, the service capacity information of the partitions in the database system, and the current partition usage information of the table.

14. A database system, comprising: a master node and worker nodes, wherein the master node is configured to:

acquire reserved throughput of a table, service capacity information of partitions in the database system, and current partition usage information of the table, wherein the reserved throughput of the table is estimated by a maximum number of records that the table processes within a unit of time;

determine partition configuration of the table according to the reserved throughput of the table, the service capacity information of the partitions in the database system, and the current partition usage information of the table; and configure partitions of the table according to the partition configuration of the table, and schedule the partitions of the table to the worker nodes; and the worker node is configured to:

load and/or unload partitions of each table on the worker node according to partition scheduling performed by the master node on each table.

15. A non-transitory computer readable medium that stores a set of instructions that is executable by at least one processor of an electronic device to cause the electronic device to perform a table partition configuration method, the method comprising:

acquiring reserved throughput of a table that is estimated by a maximum number of records that the table processes within a unit of time;

acquiring service capacity information of partitions in the database system and current partition usage information of the table; and configuring partitions of the table according to the reserved throughput of the table, the service capacity information of the partitions in the database system, and the current partition usage information of the table.

* * * * *